US006656976B2

(12) United States Patent
Bergström et al.

(10) Patent No.: US 6,656,976 B2
(45) Date of Patent: Dec. 2, 2003

(54) PREPARATION OF WELL DISPERSED SUSPENSIONS SUITABLE FOR SPRAY DRYING

(75) Inventors: Lennart Bergström, Enskede (SE); Eric Laarz, Solna (SE)

(73) Assignee: Sandvik Aktiebolag, Sandviken (SE)

( * ) Notice: Subject to any disclaimer, the term of this patent is extended or adjusted under 35 U.S.C. 154(b) by 200 days.

(21) Appl. No.: 09/842,129

(22) Filed: Apr. 26, 2001

(65) Prior Publication Data

US 2002/0010219 A1 Jan. 24, 2002

(30) Foreign Application Priority Data

May 9, 2000 (SE) .............................................. 0001714

(51) Int. Cl.[7] ............................ B01F 17/16; B01F 3/12; C08K 3/08; C08K 3/14; C08L 79/02

(52) U.S. Cl. ........................... 516/88; 516/33; 524/406; 524/408; 524/413

(58) Field of Search ....................... 516/88, 33; 75/772; 524/406, 408, 413

(56) References Cited

U.S. PATENT DOCUMENTS 3,776,987 A * 12/1973 Grimes et al. ............ 516/88 X
4,904,411 A 2/1990 Novich et al.
5,034,508 A * 7/1991 Nishizaki et al. ......... 516/33 X
5,047,181 A 9/1991 Occhionero et al. .......... 264/28
5,205,971 A * 4/1993 Croft et al. ............. 524/408 X
6,005,040 A * 12/1999 Howland et al. ........... 524/406

FOREIGN PATENT DOCUMENTS

WO 98/00257 1/1998

OTHER PUBLICATIONS

Patent Abstracts of Japan, vol. 011, No. 124, Apr. 17, 1987, JP 61 263627 A (Nov. 21, 1986).

Patent Abstracts of Japan, vol. 012, No. 297, Aug. 12, 1988, JP 63 065940 A (Mar. 24, 1988).

L. Bergström, "Rheological Properties of Concentrated, Nonaqueous Silicon Nitride Suspensions," *J. Am. Ceram. Soc.*, 79, 12, pp. 3033–3040 (1996).

L. Bergström, "Rheological Properties of $Al_2O_3$–SiC Whisker Composite Suspensions," *J. Mater. Sci.*, 31, pp. 5257–5270 (1996).

* cited by examiner

*Primary Examiner*—Richard D. Lovering
(74) *Attorney, Agent, or Firm*—Burns, Doane, Swecker & Mathis, LLP

(57) ABSTRACT

A procedure for making well dispersed suspensions containing mixtures of powders displaying a low viscosity which remain stable over an extended period of time includes suspensions prepared in aqueous and/or ethanolic media using a cationic polyelectrolyte at the inherent pH of the mixture. The method is particularly useful for making robust slurries for subsequent spray drying of free flowing granules to be used in the fabrication of cemented carbide or cermet bodies.

8 Claims, No Drawings

PREPARATION OF WELL DISPERSED SUSPENSIONS SUITABLE FOR SPRAY DRYING

FIELD OF THE INVENTION

This invention relates to a process of preparing robust, homogeneous, well-dispersed aqueous and ethanolic multi-component mixtures, such as mixtures of WC+Co (hard metal)-based materials.

DESCRIPTION OF THE RELATED ART

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

It is of utmost importance to be able to control all of the steps in the manufacturing of reliable products using a powder metallurgy approach. For optimum performance and high reliability, materials produced by a powder metallurgy route should have a microstructure characterised by a small defect size, well dispersed phases and a homogeneous grain boundary composition. One of the problems limiting the development of materials with these characteristics relates to the difficulty of achieving a good mix of two or more particulate materials to obtain homogeneous composite mixtures. Since fine powders are cohesive and thus difficult to mix in the dry state, most mixing is performed in the wet state. Typically, the particulate components are mixed with a liquid, a proper dispersant and possibly further additives so that a well dispersed, non-agglomerated slurry can be made. If this is done right, i.e. a proper dispersant is used to disperse the powder, it is possible to obtain a very homogeneous particulate mixture.

The slurry is then processed further. One of the most common shaping methods involves dry pressing; this requires the production of free flowing granules, usually by spray drying the slurry. This is the most common method of producing hard metal (WC+Co-based) inserts for metal cutting applications. It is clear that spray drying of fine powders in large quantities requires a high degree of process control to reach the desired microstructural characteristics and size distribution of the granules. One of the controlling parameters of the spray drying process is the viscosity of the slurry. It is preferred that the slurry should display a low viscosity at the appropriate shear rates. Shear thickening has to be avoided as a sudden increase in viscosity at high shear rates may cause clogging or serious damage to the spraying nozzle.

The importance of the suspensions in reliable processing has resulted in a substantial interest in developing technologies and methods for preparing well dispersed, homogeneous particulate slurries displaying a low viscosity. Well-established recipes exist today for several materials in both aqueous and non-aqueous media. A commercial dispersant, Hypermer KD3, produced by ICI Chemicals has proved to disperse a wide range of ceramic powders in non-polar media, e.g. silicon nitride (L. Bergström, "Rheological properties of concentrated, non-aqueous silicon nitride suspensions", J. Am. Ceram. Soc., 79, 3033, 1996), and alumina (L. Bergström, "Rheological properties of $Al_2O_3$ and SiC-whisker composite suspensions", J. Mater. Sci., 31, 5257, 1996).

Thickeners represent a different group of polymeric additives used for adjustment and control of the rheological properties. They are commonly used to increase the viscosity of the liquid to reduce the settling and thus prevent segregation. In WO 98/00257 it is shown that by the addition of suitable thickeners it is possible to prevent settling of cemented carbide slurries while still producing suitable rheological characteristics for spray drying.

Polyelectrolytes are usually the dispersant of choice when preparing aqueous inorganic powder suspensions. The popularity of polyelectrolytes stems from their low cost and high efficiency in dispersing many different kinds of powders in aqueous media. The effect of polyelectrolyte addition on the colloidal stability and theological behaviour is determined by a complex interplay between the polyelectrolyte, the powder surface and the solution phase. In order to understand the adsorption behaviour of polyeletrolytes and the nature of the induced interparticle forces, one has to consider the surface chemistry of the solid phase as well as the solution properties of the polyelectrolyte. Polyelectrolytes acquire a charge in aqueous solutions due to the dissociation of functional groups; i.e., both the conformation and charged fraction of the polyelectrolyte is strongly dependent on pH and ionic strength. The surface charge density of the solid phase is also controlled by the solution conditions. Fundamentally, the surface charge density is dependent on the number and density of surface groups, the pKa values of the surface reactions and the ionic strength of the solution.

Previous studies have shown that pH is a very important parameter in controlling polyelectrolyte adsorption. It is useful to distinguish between pH regimes where the particle surface and the polyelectrolyte carry net charges of either the same or opposite sign. If the segment-surface interaction is purely electrostatic, adsorption will only take place if the polyelectrolyte bears a net charge of the opposite sign. This is the basis of the general rule that an acidic powder, which displays a negative surface charge over most of the pH-range, can be dispersed using a positively charged, cationic polyelectrolyte. Oppositely, a basic powder, which carries a positive charge over most of the pH-range, can be dispersed using a negatively charged, anionic polyelectrolyte.

For example, well-dispersed, highly concentrated alumina suspensions have been prepared by Novich et al (U.S. Pat. No. 4,904,411) using low amounts (0.5–2 wt %) of a polyacrylate polyelectrolyte. They used the same type of dispersant for dispersing steel powder and zirconia. Novich et al were also able to disperse acidic powders like silica using a cationic polyelectrolyte called CORCAT P-12 and P-600.

Although these principles have been most useful for finding suitable dispersants for simple ceramic systems, the situation rapidly becomes more complex when the number of particulate constituents in a slurry is increased. When the suspension contains mixtures of acidic and basic powders it is usually necessary to resort to trial and error to find a suitable dispersant for a specific system.

Hard metals, such as mixtures of WC and Co, together with additional particulate constituents, are commercially important systems which have to be dispersed and spray dried for subsequent mass production of, for example, inserts for metal cutting tools. However, the slightly soluble and widely different acid/base properties of the two main particulate constituents (WC or rather the surface oxide $WO_3$ is acidic and CoO is basic) make this system difficult to disperse in polar media. The current process technology typically involves dispersing the powders in an ethanol-rich medium under strong agitation prior to spray drying. The solids content in the mixture must be relatively low, around 20 vol %, to keep the viscosity at a sufficiently low level. With robust, well dispersed suspensions of WC+Co-based particulate mixtures there is a possibility to increase the solids content and thus reduce the energy consumption during spray drying. There is also a large interest in developing well dispersed aqueous suspensions of WC+Co-based particulate mixtures to eliminate the explosion hazards and reduce the environmental impact of ethanol-based suspensions.

SUMMARY OF THE INVENTION

The present invention addresses the above-referenced problems of the conventional art.

The present invention provides a procedure for making well-dispersed suspensions.

The present invention provides a procedure for making well dispersed suspensions comprising mixtures of WC and Co powders displaying a low viscosity, which remain stable over an extended period of time. According to the present invention, aqueous and ethanolic slurries are suitable as the starting materials for all wet processing techniques for producing materials for these powders. These processing routes include spray drying to make spherical, free flowing granules of the fine powder.

According to one aspect, the present invention provides a well dispersed slurry with low viscosity comprising: a liquid medium comprising water, ethanol, or a mixture thereof; 10–50% by volume solids content; and a dispersant comprising 0.1–10 wt % of a polyethylenimine-based polyelectrolyte.

According to another aspect, the present invention provides a method of making a body of cemented carbide or cermet comprising: forming a slurry by wet milling powder forming hard constituents, powder forming a binder phase, a pressing agent, a liquid medium comprising water, ethanol, or a mixture thereof, a pressing agent, and a dispersant comprising 0.1–10 wt % of a polyethylenimine-based polyelectrolyte; drying the slurry to form a powder; pressing the powder to form a body; and sintering the pressed body.

According to a preferred embodiment the slurries of the present invention can be used to produce inserts for metal cutting tools.

DETAILED DESCRIPTION OF THE INVENTION

The present invention is directed to dispersing mixtures of powders in aqueous and ethanolic media to produce well-dispersed slurries having a low viscosity. Further, the invention provides a method for making homogeneous powder bodies by different types of wet processing techniques, including spray drying and subsequent dry pressing. The invention provides a method for processing cemented carbide powders in aqueous and ethanolic media for production of inserts for metal cutting tools.

According to a preferred embodiment, the procedure according to the invention comprises forming a slurry including the powders, a polyethylenimine-based dispersant for the solid phases, and water or ethanol or mixtures of water and ethanol as the medium. The resulting slurry should be well-dispersed, robust and display a low viscosity to facilitate subsequent wet processing, e.g. spray drying.

By a low viscosity, we mean that a slurry with 20 vol % solids should display a viscosity of less than 30 mPas at a shear rate of 100 1/s, preferably less than 15 mPas at this shear rate. For a slurry with 40 vol % solids, low viscosity means less than 1000 mPas at a shear rate of 100 1/s.

By a robust slurry, we mean that its theological properties should be stable over an extended period of time. For a slurry with 20 vol % solids, the viscosity should increase less than 20% over a period of 24 hours.

The invention is directed to all kinds of powder slurries intended for manufacturing of cemented carbides such as WC+Co based slurries. This includes, for example, additions of carbides and nitrides of titanium, tantalum, hafnium and/or niobium to the WC+Co mixture. It is particularly suited for fine, sub-micron-sized particles, but is also applicable to coarser particles. The dispersion medium can be ethanol, water or mixtures of ethanol and water. While it is preferable to use distilled or deionized water for producing aqueous slurries, ordinary tap water is also suitable. The dispersants that are able to produce well-dispersed WC+Co-based slurries are polyelectrolytes, more specifically a cationic polyelectrolyte of the polyethylenimine type. The polyethylenimine type dispersants consist of a general backbone based on the monomer $(CH_2CH_2NH)_x$ and contain primary, secondary and tertiary amine groups. An important property is that the polyethylenimine-based dispersant is able to disperse the WC+Co-based powder mixture at the inherent pH of the slurry; hence, no addition of acid or base is needed.

The powder, the dispersant, and the polar dispersion medium may be combined in any suitable manner. In a preferred embodiment, the slurry is made by mixing the dispersant with ethanol, water or mixtures thereof and then adding the powders to the solutions. Generally, the amount of dispersant used in the mixture is 0.1–10 wt %, preferably 0.1–1wt %. The solids loading is 10–50 vol %, preferably 20–40 vol %, which is the most suitable range for spray drying. All of the components are mixed in a high-energy mixer, e.g. a ball mill or a planetary mill. Mixing proceeds for a period from 10 minutes to 48 hours; 30 minutes to 2 hours are preferred mixing times in a planetary mill for solids loadings between 20 and 40 vol %.

The present invention also relates to a method of making cemented carbide or cermets bodies by powder metallurgical methods including wet milling in water and/or ethanol of powder forming hard constituents and binder phase and a pressing agent to form a slurry, drying the slurry to form a powder by spray drying, pressing the powder to form bodies of desired shape and dimension and finally sintering. The method is characterised in adding to the slurry as dispersant 0.1–10 wt %, preferably 0.1–1 wt %, of a polyethylenimine-based polyelectrolyte. Most preferably, the average molecular weight of the polyethyleninine-based polyelectrolyte is in the range 5,000 to 50,000, preferably 10,000 to 30,000.

The invention has been described with reference to WC–Co-based cemented carbides. It is obvious the invention can be applied also to the manufacture of hard materials based on carbides and nitrides of Ti, Ta, Hf and/or Nb and Co and/or Ni often referred to as cermets.

The principles of the present invention will now be described in reference to the following examples, which are intended to be illustrative, and not restrictive.

EXAMPLE 1

An aqueous slurry with 20 vol % solids of a mixture of WC and Co powders (92 wt % WC and 8 wt % Co) displaying a low viscosity was prepared in the following manner: 355 grams of a WC+Co powder with an average particle size of 1.2 μm were mixed with 1.07 grams (0.3 wt %) of polyethylenimine with an average molecular weight of 10,000 (available from Polysciences Inc.) and 96 grams of water. The components were mixed together in a planetary mill for a total mixing time of 30 minutes, divided into three 10-minute periods. The resulting slurry displayed a low viscosity of 9 mPas at a shear rate of 100 1/s and 90 mPas at a shear rate of 1 1/s.

EXAMPLE 2

An aqueous slurry with 20 vol % solids loading of a mixture of WC and Co powders (92 wt % WC and 8 wt % Co) displaying a low viscosity was prepared in the following manner: 355 grams of a WC+Co powder with an average particle size of 1.2 μm were mixed with 3.55 grams (1 wt %) of polyethylenimine with an average molecular weight of 25,000 (available from Aldrich Chemicals) and 96 grams of water. The components were mixed together in a planetary mill for a total mixing time of 30 minutes divided into three 10-minute periods. The resulting slurry displayed a low a viscosity after 12 hours of subsequent stirring; the viscosity was 8 mPas at a shear rate of 100 1/s and 15 mPas at a shear rate of 10 1/s. Ageing the slurry for an additional 24 hours under continuous stirring increased the viscosity marginally; the viscosity was 9 mPas at a shear rate of 100 1/s and 18 mPas at a shear rate of 10 1/s.

EXAMPLE 3

An aqueous slurry with 40 vol % solids of a mixture of WC and Co powders (92 wt % WC and 8 wt % Co) displaying a low viscosity was prepared in the following manner: 414 grams of a WC+Co powder with an average particle size of 1.2 μm were mixed with 1.24 grams (0.3 wt %) of polyethylenimine with an average molecular weight of 10,000 (available from Polysciences Inc.) and 42 grams of water. The components were mixed together in a planetary mill for a total mixing time of 30 minutes, divided into six 5-minute periods. The resulting slurry displayed a relatively low viscosity of 450 mPas at a shear rate of 100 1/s.

EXAMPLE 4

A slurry with 20 vol % solids of a mixture of WC and Co powders (92 wt % WC and 8 wt % Co) in an ethanol/water mixture (80% ethanol) displaying a low viscosity was prepared in the following manner: 355 grams of a WC+Co powder with an average particle size of 1.2 μm were mixed with 3.55 grams (1 wt %) of polyethylenimine with an average molecular weight of 25,000 (available from Aldrich Chemicals) and 61 grams of ethanol and 15 grams of water. The components were mixed together in a planetary mill for a total mixing time of 30 minutes, divided into three 10-minute periods. The resulting slurry displayed a low a viscosity after 12 hours of subsequent stirring, the viscosity was 13 mPas at a shear rate of 100 1/s and 25 mPas at a shear rate of 10 1/s.

EXAMPLE 5

An ethanol-based slurry with 20 vol % solids of a mixture of WC and Co powders (92 wt % WC and 8 wt % Co) displaying a low viscosity was prepared in the following manner: 355 grams of a WC+Co powder with an average particle size of 1.2 μm were mixed with 1.78 grams (0.5 wt %) of polyethylenimine with an average molecular weight of 25,000 (available from Aldrich Chemicals) and 76 grams of ethanol. The components were mixed together in a planetary mill for a total mixing time of 75 minutes, divided into five 15-minute periods. The resulting slurry displayed a low viscosity after 12 hours of subsequent stirring, the viscosity was 26 mPas at a shear rate of 100 1/s and 50 mPas at a shear rate of 10 1/s.

EXAMPLE 6

Prior Art

As an example of prior art, an aqueous slurry with 20 vol % solids of a mixture of WC and Co powders (92 wt % WC and 8 wt % Co), and polyethylene glycol (PEG) as a dispersant was prepared in the following manner: 355 grams of a WC+Co powder with an average particle size of 1.2 μm were mixed with 7.1 grams (2 wt %) of polyethylene glycol with an average molecular weight of 3,400 and 96 grams of water. The components were mixed together in a planetary mill for a total mixing time of 30 minutes, divided into three 10-minute periods. The resulting slurry was flocculated and displayed a relatively high viscosity of 50 mPas at a shear rate of 100 1/s and 4000 mPas at a shear rate of 1 1/s.

EXAMPLE 7

An ethanol-based slurry with 20 vol % solids of a mixture of WC, TaC, TiC, TiN and Co powders (20 wt % WC, 20 wt % TaC, 25 wt % TiC, 20 wt % TiN and 15 wt % Co) displaying a low viscosity was prepared in the following manner: 1000 grams of WC+TaC+TiC+TiN+Co powder with an average particle size of 1.3 μm were mixed with 3.00 grams (0.3 wt %) of polyethylenimine with an average molecular weight of 25,000 (available from Aldrich Chemicals) and 421 grams of ethanol/water (90 wt % ethanol and 10 wt % water) and 35 grams of polyethyleneglycol with an average molecular weight of 3,500 (available from BASF). The components were mixed together in a ball mill for a total mixing time of 100 h. The resulting slurry displayed a low viscosity of 25 mPas at a shear rate of 100 1/s.

EXAMPLE 8

A water-based slurry with 20 vol % solids of a mixture of WC, TaC, TiC, TiN and Co powders (20 wt % WC, 20 wt % TaC, 25 wt % TiC, 20 wt % TiN and 15 wt % Co) displaying a low viscosity was prepared in the following manner: 1000 grams of WC+TaC+TiC+TiN+Co powder with an average particle size of 1.3 μm were mixed with 3.00 grams (0.3 wt %) of polyethylenimine with an average molecular weight of 25,000 (available from Aldrich Chemicals) and 514 grains of water and 35 grains of polyethyleneglycol with an average molecular weight of 3,500 (available from BASF). The components were mixed together in a ball mill for a total mixing time of 100 h. The resulting slurry displayed a low viscosity of 30 mPas at a shear rate of 100 1/s.

EXAMPLE 9

An ethanol-based slurry with 20 vol % solids of a mixture of WC, TaC, TiC, TiN and Co powders (87 wt % WC, 3 wt % TaC, 2 wt % NbC, 2 wt % TiC, 0.5 wt % LiN and 5.5 wt % Co) displaying a low viscosity was prepared in the following manner: 1000 grams of WC+TaC+TiC+TiN+Co powder with an average particle size of 6.0 μm were mixed with 5.00 grams (0.5 wt %) of polyethylenimine with an average molecular weight of 25,000 (available from Aldrich Chemicals), 230 grams of ethanol/water (90 wt % ethanol and 10 wt % water), and 20 grams of polyethyleneglycol with an average molecular weight of 3,500 (available from BASF). The components were mixed together in a ball mill for a total mixing time of 100 h. The resulting slurry displayed a low viscosity of 29 mPas at a shear rate of 100 l/s.

EXAMPLE 10

An ethanol-based slurry with 20 vol % solids of a mixture of WC, TaC, TiC, TiN and Co powders (84 wt % WC, 4 wt % TaC, 2 wt % NbC, 3 wt % TiC, 0.5 wt % TiN and 6.5 wt % Co) displaying a low viscosity was prepared in the following manner: 1000 grains of WC+TaC+TiC+TiN+Co powder with an average particle size of 6.0 μm were mixed with 5.00 grams (0.5 wt %) of polyethylenimine with an average molecular weight of 25,000 (available from Aldrich Chemicals), 235 grams of ethanol/water (90 wt % ethanol and 10 wt % water), and 20 grams of polyetheneglycol with an average molecular weight of 3,500 (available from BASF). The components were mixed together in a ball mill for a total mixing time of 100 h. The resulting slurry displayed a low viscosity of 30 mPas at a shear rate of 100 l/s.

While the present invention has been described by reference to the above-mentioned embodiments, certain modifications and variations will be evident to those of ordinary skill in the art. Therefore, the present invention is to limited only by the scope and spirit of the appended claims.

What is claimed is:

1. A well dispersed slurry with low viscosity comprising:
   a liquid medium comprising water, ethanol, or a mixture thereof;
   10–50% by volume solids content the solids comprising WC-based and Co-based particles; and
   a dispersant comprising 0.1–10 wt % of a polyethylenimine-based polyelectrolyte.

2. The slurry according to claim 1, wherein the dispersant comprises 0.1–1 wt % of a polyethylenimine-based polyelectrolyte.

3. The slurry according to claim 1, wherein the average molecular weight of the polyethylenimine-based polyelectrolyte is in the range 5,000 to 50,000.

4. The slurry according to claim 3, wherein the average molecular weight of the polyethylenimine-based polyelectrolyte is 10,000 to 30,000.

5. A well dispersed slurry with low viscosity comprising:
   (i) a liquid medium comprising water, ethanol or a mixture thereof;
   (ii) 10–50 % by volume solids content, the solids comprising particles based on
      (a) at least one of a carbide and a nitride formed from one or more of Ti, Ta, Hf and Nb, and
      (b) at least one of Co and Ni; and
   (iii) a dispersant comprising 0.1–10 wt % of polyethylenimine-based polyelectrolyte.

6. The slurry according to claim 5, wherein the dispersant comprises 0.1–1 wt % of a polyethylenimine-based polyelectrolyte.

7. The slurry according to claim 6, wherein the average molecular weight of the polyethylenimine-based polyelectrolyte is the range 5,000 to 50,000.

8. The slurry according to claim 7, wherein the average molecular weight of the polyethylenimine-based polyelectrolyte is 10,000 to 30,000 .

* * * * *